(12) United States Patent
Shaw

(10) Patent No.: US 9,942,522 B2
(45) Date of Patent: Apr. 10, 2018

(54) IN-VEHICLE CAMERA SYSTEM

(71) Applicant: Faraday&Future Inc., Gardena, CA (US)

(72) Inventor: Hamed Shaw, Sunnyvale, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 167 days.

(21) Appl. No.: 14/860,672

(22) Filed: Sep. 21, 2015

(65) Prior Publication Data

US 2017/0054949 A1    Feb. 23, 2017

Related U.S. Application Data

(60) Provisional application No. 62/207,325, filed on Aug. 19, 2015.

(51) Int. Cl.
| | |
|---|---|
| *H04N 7/18* | (2006.01) |
| *B60R 1/00* | (2006.01) |
| *G02B 27/01* | (2006.01) |
| *G06K 9/00* | (2006.01) |

(52) U.S. Cl.
CPC ............... *H04N 7/181* (2013.01); *B60R 1/00* (2013.01); *G02B 27/0101* (2013.01); *G06K 9/00838* (2013.01); *B60R 2300/105* (2013.01); *B60R 2300/205* (2013.01); *B60R 2300/8013* (2013.01); *G02B 2027/0138* (2013.01)

(58) Field of Classification Search
CPC ....................................................... H04N 7/181
USPC ................................................................ 348/148
See application file for complete search history.

(56) References Cited

U.S. PATENT DOCUMENTS

| | | | |
|---|---|---|---|
| 2015/0077556 A1* | 3/2015 | Reed | H04N 7/183 348/148 |
| 2015/0264296 A1* | 9/2015 | Devaux | H04N 5/77 386/226 |
| 2016/0082888 A1* | 3/2016 | Kothari | B60R 1/00 348/148 |

* cited by examiner

*Primary Examiner* — Richard Torrente
(74) *Attorney, Agent, or Firm* — Finnegan, Henderson, Farabow, Garrett & Dunner, LLP

(57) ABSTRACT

A camera system for a vehicle may include a control interface configured to receive an input from a driver and generate a signal, and at least one camera configured to capture video of an interior of the vehicle. The camera system may also include a display configured to output video to the driver, and a controller in communication with the control interface, the camera, and the display. The controller may be configured to receive the signal from the control interface, actuate the at least one camera to capture video based on the signal, and output the video to the display based on the signal.

16 Claims, 3 Drawing Sheets

IN-VEHICLE CAMERA SYSTEM

CROSS REFERENCE TO RELATED APPLICATIONS

This application claims the benefit of priority based on U.S. Provisional Patent Application No. 62/207,325 filed on Aug. 19, 2015, the entire disclosure of which is incorporated by reference.

TECHNICAL FIELD

The present disclosure relates generally to a camera system for a vehicle, and more particularly, to an in-vehicle camera system.

BACKGROUND

Drivers often cause accidents when distractions within the vehicle consume their attention. Common distractions include small children, who may require special attention from an adult. Because of potential issues with the deployment of an airbag, it is often recommended to place the child in the back seat. However, this placement makes it difficult for the driver to pay attention to the child and may, at times, require the driver to turn his/her head around to view the child. The separation of the child sitting in the back seat may cause fussing, which only increases the distraction for the driver.

The rear-view mirror allows the driver to view occupants in the back seat, to a certain extent, without requiring the driver to turn his/her head around. However, in order to view the back seat, the driver may have to take a hand off of the steering wheel and to divert his/her eyes from the road to adjust the rear-view mirror. Adjusting the rear-view mirror may also reduce the driver's visibility of objects behind the vehicle. Furthermore, the rear-view mirror may not provide a sufficient view of children who are not looking directly at the mirror, such as a child sitting in a backward-facing child car seat.

The disclosed camera system is directed to mitigating or overcoming one or more of the problems set forth above and/or other problems in the prior art.

SUMMARY

One aspect of the present disclosure is directed to a camera system for a vehicle. The camera system may include a control interface configured to receive an input from a driver and generate a signal, and at least one camera configured to capture video of an interior of the vehicle. The camera system may also include a display configured to output video to the driver, and a controller in communication with the control interface, the at least one camera, and the display. The controller may be configured to receive the signal from the control interface, actuate the at least one camera to capture video based on the signal, and output the video to the display based on the signal.

Another aspect of the present disclosure is directed to a method for displaying an interior of a vehicle. The method may include receiving an input from a driver, responsively generating a signal, and receiving the signal in a controller. The method may also include detecting occupants of the vehicle and actuating, via the controller, at least one camera to capture video based on the detected occupants. The method may further include displaying the video to the driver.

Yet another aspect of the present disclosure is directed to a vehicle. The vehicle may include a driver seat configured to accommodate a driver, and a camera system. The camera system may include a control interface configured to receive an input from the driver and generate a signal, and at least one camera configured to capture video of an interior of the vehicle. The camera system may also include a display configured to output video to the driver, and a controller in communication with the control interface, the at least one camera, and the display. The controller may be configured to receive the signal from the control interface, actuate the at least one camera to capture video based on the signal, and output the video to the display based on the signal.

Still another aspect of the present disclosure is directed to a non-transitory computer-readable medium storing instructions which, when executed, cause one or more processors to perform a method of displaying an interior of a vehicle. The method may include receiving an input from a driver, responsively generating a signal, and receiving the signal in a controller. The method may also include detecting occupants of the vehicle and actuating, via the controller, at least one camera to capture video based on the detected occupants. The method may further include displaying the video to the driver.

DETAILED DESCRIPTION

The disclosure is generally directed to a camera system configured to display a vulnerable vehicle occupant, such as a child or animal, positioned in a back seat of a vehicle, without a driver having to substantially divert his/her sight-line. According to some embodiments, the camera system may include multiple cameras having different perspectives and image recognition software that may detect facial features of the child. When activated, the camera system may locate the child and project a video or image on a head-up display in front of the driver. The driver would therefore not have to turn his/her head around for visualization while the vehicle is in motion.

Figure 1:
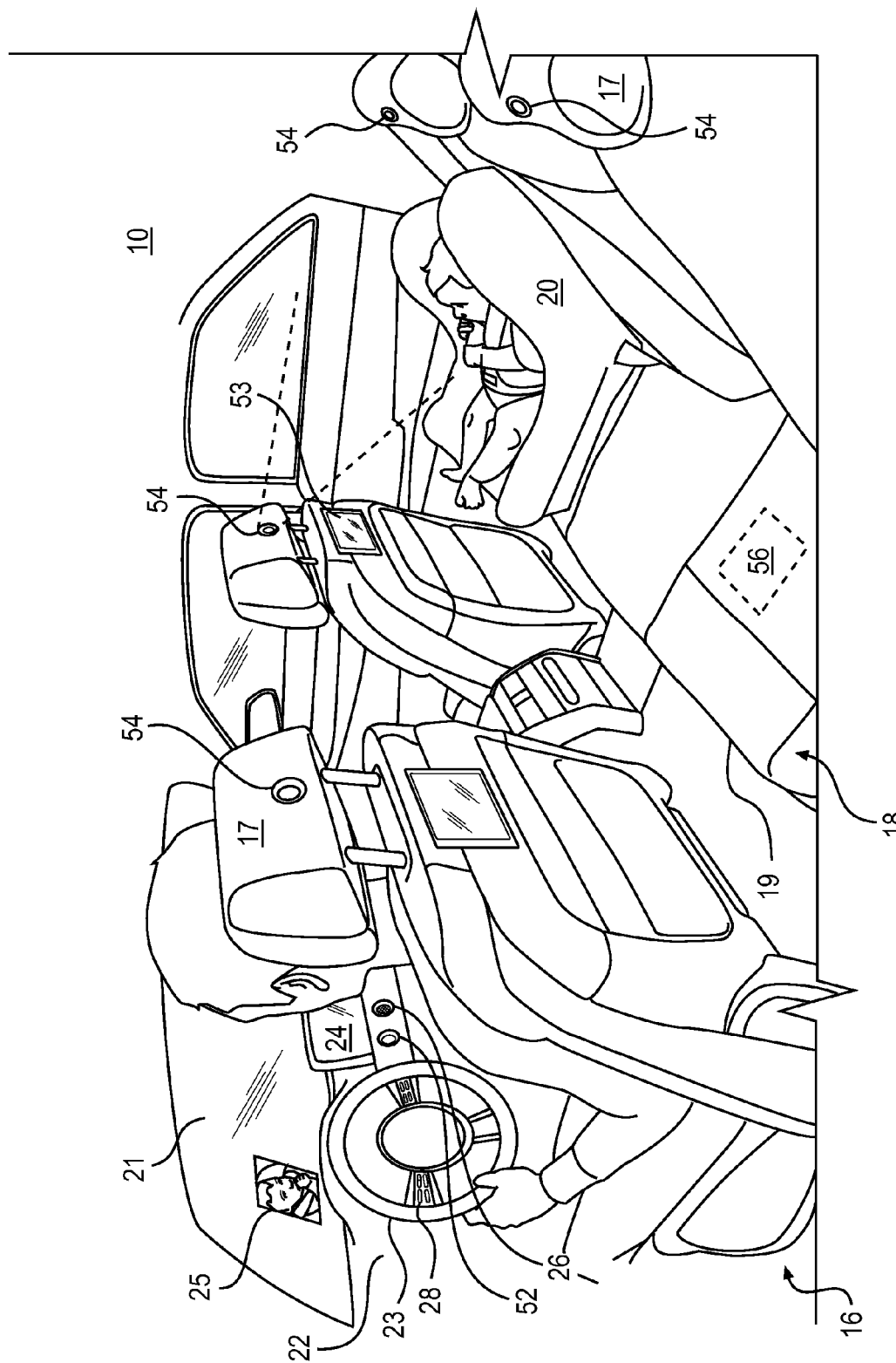
FIG. 1 is a diagrammatic illustration of an exemplary vehicle interior, according to an exemplary embodiment of the disclosure.

FIG. 1 provides a diagrammatic illustration of an exemplary vehicle interior according to an exemplary embodiment of the disclosure. As illustrated in FIG. 1, a vehicle 10 may include, among other things, a windshield 21, a dashboard 22, a steering wheel 23, a pair of front seats 16, and one or more back seats 18. At least one of the seats 16, 18 may accommodate a child car seat 20 to support an occupant of a younger age and/or smaller size. Vehicle 10 may be an electric vehicle, a fuel cell vehicle, a hybrid vehicle, or a conventional internal combustion engine vehicle. Vehicle 10 may have any body style, such as a sports car, a coupe, a sedan, a pick-up truck, a station wagon, an SUV, a minivan, or a conversion van. Seats 16, 18 may be arranged in any number of rows. For example, back seat 18 may be in a second row of a sedan, or in a second and/or third row of a minivan.

Vehicle 10 may also have various electronics installed therein to transmit and receive data related to the occupants. For example, dashboard 22 may house or embed a user interface 24, a microphone 26, and a driver camera 52. Steering wheel 23 may include at least one control interface 28 configured to receive an input from the driver. Furthermore, seats 16, 18 may have a headrest 17 including a rear camera 54, and a seat base 19 including a weight sensor 56. Front seats 16 may each additionally support a display 53.

Driver camera 52 and rear camera 54 may include any device configured to capture videos or images of the interior of vehicle 10 and generate a signal to be processed to visually detect the presence of occupants of vehicle 10. For example, cameras 52, 54 may be used in conjunction with image recognition software, such that the software may distinguish a person from inanimate objects, and may recognize certain people based on physical appearances. In some embodiments, the image recognition software may include facial recognition software and may be configured to determine the age (e.g., by determining size and facial appearances) and any physical ailments (e.g., by determining facial expressions, skin tone, and other physical indicators) of occupants based on the videos or the images. The image recognition software may also be configured to detect characteristics of animals.

Cameras 52, 54 may also be configured to be adjusted by a motor (not shown) to improve a video or an image of the occupant. For example, the motor may be configured to tilt cameras 52, 54 in a horizontal and/or vertical plane to substantially center the occupant(s) in the frame. The motor may also be configured to adjust the focal point of the cameras 52, 54 to substantially focus on the facial features of the occupant(s).

Driver camera 52 may be in a number of positions and at different angles to capture video or images of the driver and/or occupants of front seat 16. For example, driver camera 52 may be located on dashboard 22, but may, additionally or alternatively, be positioned at a variety of other locations, such as on windshield 21, on steering wheel 23, and/or on structural pillars of vehicle 10.

Rear cameras 54 may be directed forward and/or backward on any number of seats 16, 18 to capture facial features of occupants in back seat 18 facing either forward or backward. For example, as depicted in FIG. 1, vehicle 10 may include rear cameras 54 on a back of each headrest 17 of front seats 16 and on a front of each headrest 17 of back seats 18. Vehicle 10 may also include cameras at a variety of other locations, such as, on a ceiling, doors, a floor, and/or other locations on seats 16, 18 in order to capture video or images of occupants of back seat 18. Vehicle 10 may, additionally or alternatively, include a dome camera positioned on the ceiling and configured to capture a substantially 360° image of the interior of vehicle 10.

Each seat 16, 18 may include weight sensor 56 configured to generate a weight signal based on a weight placed on each seat 16, 18. As depicted in FIG. 1, weight sensor 56 may be incorporated within the interior of seats 16, 18. Weight sensor 56 may embody a strain gauge sensor configured to determine a change in resistance based on a weight. Weight sensor 56 may be incorporated into a support of seats 16, 18 or may be a separate component. For example, weight sensor 56 may be incorporated into child car seat 20.

Control interface 28 may be conveniently positioned on steering wheel 23 to allow the driver to provide input with minimal distraction. Control interface 28 may include one or more buttons configured to provide input pertaining to a variety of functions of vehicle 10. For example, control interface 28 may be configured to actuate one or more cameras 52, 54 to capture a video or image, and to initiate the display of the video or image. Control interface 28 may include a first button to actuate driver camera 52 to capture the driver, and output the video or image to one or more of displays 53 visible to occupants of back seat 18. In one embodiment, control interface 28 may also include a second button to actuate a plurality of rear cameras 54 to determine the best view of one or more occupants of back seats 18. The video or image from rear camera 54 with the best view of the one or more occupants may be displayed to the driver. This configuration may limit the distraction to the driver since the occupants may be positioned in a variety of positions in back seat 18. However, control interface 28 may, alternatively, include a separate button to actuate each rear camera 54. Control interface 28, additionally or alternatively, may include one or more touchpads with different portions to control each function of vehicle 10.

User interface 24 may be configured to receive input from the user and transmit media. User interface 24 may include an LCD, an LED, a plasma display, or any other type of display. User interface 24 may provide a Graphical User Interface (GUI) presented on the display for user input and data display. User interface 24 may further include a touchscreen, a keyboard, a mouse, or a tracker ball to enable user input. User interface 24 may be configured to receive user-defined settings. For example, user interface 24 may be configured to receive a driver profile, including the desired position of HUD 25. User interface 24 may also be configured to receive physical characteristics of common occupants (e.g., children) of back seat 18. For example, user interface 24 may be configured to receive an indicative weight or an indicative image of one or more children that often sit in back seat 18. User interface 24 may also be configured to receive indications of any other people or animals that the driver may want to visualize via cameras 52, 54. User interface 24 may be further configured to transmit audio through common car speakers and/or separate speakers.

Microphone 26 may include any structure configured to capture audio and generate audio signals (e.g., recordings) of interior of vehicle 10. As depicted in FIG. 1, microphone 26 may be centrally located on dashboard 22 to capture audio and responsively generate an audio signal in order to control cameras 52, 54. For example, microphone 26 may be configured to capture voice commands from the driver in order to control cameras 52, 54. Microphone 26 may also be configured to capture audio from occupants of back seat 18 in order to control cameras 52, 54. Microphone 26 may, additionally or alternatively, be positioned in other locations throughout vehicle 10, such as on the back of front passenger seats 16, on the front of back passenger seats 18, and/or incorporated into child seat 20.

Vehicle 10 may also include a head-up display (HUD) 25 that may be projected onto windshield 21. HUD 25 may be pre-installed into vehicle, housed or embedded into dashboard. In another embodiment, HUD 25 may be a separate component positionable on a top surface of a dashboard. For example, HUD 25 may be secured with a releasable adhesive, a suction cup, or the like. HUD 25 may be positioned substantially aligned with a steering wheel 15 to allow the driver to visualize the data without having to redirect his/her sightline.

HUD 25 may be configured to project text, graphics, and/or images onto windshield 21 to provide the driver a vast amount of information pertaining to the driver and/or vehicle 10. HUD 25 may be configured to display turn-by-turn directions to the driver, or may be configured to warn the driver of road conditions, such as construction or traffic. HUD 25 may also be configured to mirror data from at least one of instrument panel (not shown) and user interface 24. For example, HUD 25 may be configured to display the speed of vehicle 10 to the driver. HUD 25 may also be configured to display other conditions of vehicle 10, such as battery level, fuel level, water level, and engine speed. HUD 25 may further be configured to display video and/or images captured by cameras 52, 54. According to some embodiments, one or more of the types and/or conditions may be displayed adjacent one another, and/or may be superimposed relative to one another.

Display 53 may be positioned on back of each front seat 16 to output images, videos, and/or other types of visual media to passengers in back seat 18. Display 53 may include an LCD, an LED, a plasma display, or any other type of display. Display 53 may be configured to display video or images captured by driver camera 52, in real time. Display 53 may also be configured to display other types of visual media, such as movies or television shows. Display 53 may be enabled in response to a number of different conditions. In one embodiment, display 53 may be enabled when driver camera 52 is actuated. In another embodiment, display 53 may be enabled in response to audio received by microphone 26, such as a child crying. In yet another embodiment, display 53 may be enabled whenever camera system 11 determines that a child is occupying back seat 18. For example, in some embodiments, display 53 may be operatively connected to weight sensor 53 and/or cameras 52, 54, in order to enable only displays 53 directly visible to (e.g., positioned in front of) the occupants of back seat 18.

Figure 2:
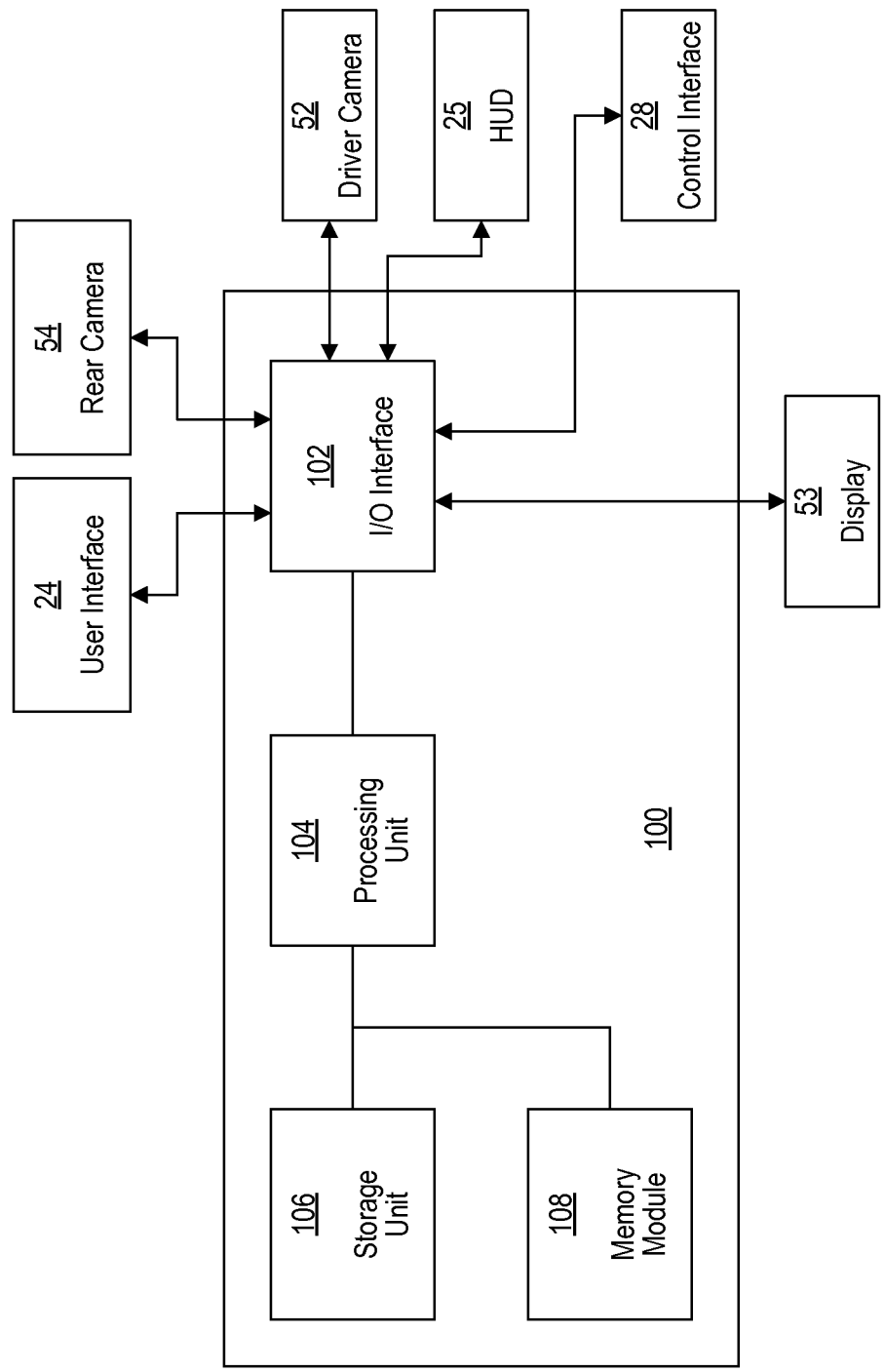
FIG. 2 is a block diagram of an exemplary camera system that may be used with the exemplary vehicle of FIG. 1, according to an exemplary embodiment of the disclosure.

FIG. 2 provides a block diagram of an exemplary camera system 11 that may be used in accordance with the method of displaying an interior of vehicle 10. As illustrated in FIG. 2, camera system 11 may include a controller 100 having, among other things, an I/O interface 102, a processing unit 104, a storage unit 106, and a memory module 108. These components may be configured to transfer data and send or receive instructions between or among each other.

I/O interface 102 may also be configured for two-way communication between controller 100 and various components of camera system 11. For example, as depicted in FIG. 2, I/O interface 102 may send and receive operating signals to and from user interface 24, HUD 25, control interface 28, driver camera 52, display 53, and rear camera 54. I/O interface 102 may send and receive the data between each of the components via communication cables, wireless networks, or other communication mediums.

Processing unit 104 may be configured to receive signals from components of camera system 11 and process the signals. Processing unit 104 may also be configured to generate and transmit command signals, via I/O interface 102, in order to actuate the components of camera system 11.

For example, processing unit 104 may be configured to receive input from control interface 28 and responsively actuate cameras 52, 54 to capture video and images of the interior of vehicle 10. The video and images can be displayed in a variety of means. For example, the driver may manipulate control interface 28 to generate a command signal to controller 100, in order to actuate rear cameras 54. Rear cameras 54 may then capture a video or image of an occupant in back seat 18. This configuration may allow the driver to see a display of a child in back seat 18, whenever desired, without substantially diverting his/her sightline. The videos or images may be displayed continuously or for a predetermined time period after manipulation of control interface 28. Similarly, the driver may actuate control interface 28 to actuate driver camera 52 to capture a video or image of the driver, and transmit the signal to display 53 to be viewed by an occupant of back seat 18. The video or image of the driver in display 53 may, in turn, provide a calming influence to a child of the back seat 18.

In some embodiments, processing unit 104 may be configured to determine the presence of occupants in back seat 18 and responsively actuate cameras 52, 54. Vehicle 10 may include a plurality of cameras 52, 54 configured to capture videos or images of occupants of back seat 18. Cameras 52, 54 may be positioned throughout vehicle 10 to optimize the image of the occupant(s) depending on where he/she is seated. For example, rear camera 54, positioned on the right side of vehicle 10 and facing rearward, may provide the best perspective of occupants sitting in back seat 18 to the right and facing forward. Similarly, rear camera 54 facing forward may have a better perspective to capture video or images of an occupant sitting in child car seat 20 and facing rearward.

To improve the image of the occupants, processing unit 104 may be configured to determine the location and orientation of each occupant of back seats 18, in a number of different ways.

In one embodiment, processing unit 104 may be configured to actuate two or more rear cameras 54 of camera system 11 to initially capture an image. Controller 100 may then be configured to receive the image captured by each actuated rear camera 54 and utilize image recognition software to determine which rear camera 54 provides the most direct image a person. For example, processing unit 104 may be configured to associate an identity of the person (e.g., a child) by determined facial features of the captured image and to compare the images of the person to determine which rear camera 54 provides the most direct image of facial features of the person. Processing unit 104 may then output a video or image from whichever rear camera 54 provides the most direct image of facial features of the person. Processing unit 104 may also utilize the image recognition software to distinguish children from other people, such that the processing unit 104 may output videos or images for each child. Processing unit 104, with the image recognition software, according to some embodiments, may also be configured to determine an age of the child, and only output video or images of children under a pre-determined age.

In another embodiment, processing unit 104 may be configured to determine which seat 16, 18 is occupied by processing a weight signal generated by respective weight sensors 56. Processing unit 104 may be configured to compare the sensed weight to data of look-up tables to determine whether the sensed weight is indicative of an occupant (e.g., a child). In one embodiment, processing unit 104 may be configured to actuate only rear cameras 54 that would capture a video or image of children of back seats 18 determined to be occupied. In embodiments with a plurality rear cameras 54 facing different directions, processing unit 104 may then be configured to utilize image recognition software to determine whether the child is facing forward or backward, as discussed above, to optimize the video or image.

Processing unit 104 may also be configured to actuate cameras 52, 54 in response to one or more conditions sensed in vehicle 10. In one embodiment, processing unit 104 may be configured to capture video or images in response to audio, received by microphone 26, such as a child crying. For example, processing unit 104 may be configured to responsively actuate rear cameras 54 to capture a video or an image of the child and display the video or the image on HUD 25. Processing unit 104 may also be configured to responsively actuate driver camera 52 to capture a video or an image of the driver and display the video or the image to display 53. This feature may provide assurance to the driver and a calming influence to the crying child.

Processing unit 104 may also be configured to initiate camera system 11 based on other conditions of the child. For example, processing unit 104 may be configured to determine when the child falls asleep and/or wakes up. Processing unit 104 may also be configured to determine when the child is smiling or displaying signs of physical ailments. These determinations may be based on processing video or images captured by rear camera 54 with image recognition software. Processing unit 104 may responsively actuate rear camera 54 and HUD 25 to provide visual notice to the driver. Processing unit 104 may also responsively actuate driver camera 52 and display 53 to provide visualization to the child.

Processing unit 104 may also be configured to output a video or an image as a reminder to the driver of an occupant (e.g., a child) in back seat 18. For example, processing unit 104 may be configured to receive signals from a variety of sensors of vehicle 10 to determine when one or more conditions occur. Exemplary conditions may be when vehicle 10 is turned off, vehicle 10 is placed in park, and/or a door of vehicle 10 is opened. Processing unit 104 may then automatically actuate rear camera 54 to capture a video or an image of an occupant that the driver may not otherwise be aware of at the time. Processing unit 104 may then output the video or the image to HUD 25 and/or user interface 24 as a visual reminder to the driver. Based on the determination that an occupant remains in back seat 18, processing unit 104 may, additionally or alternatively, initiate other visual or audio warnings to alert the driver and/or other vehicle occupant(s).

Storage unit 106 and memory module 108 may include any appropriate type of mass storage provided to store any type of information that processing unit 104 may need to operate. For example, storage unit 106 may include one or more hard disk devices, optical disk devices, or other storage devices to provide storage space. Memory module 108 may include one or more memory devices including, but not limited to, a ROM, a flash memory, a dynamic RAM, and a static RAM.

Storage unit 106 and/or memory module 108 may be configured to store software for one or more computer programs that may be executed by controller 100 to perform functions of camera system 11. For example, storage unit 106 and/or memory module 108 may be configured to store image recognition software (e.g., facial recognition software) configured to analyze an image. Storage unit 106 and/or memory module 108 may be further configured to store information used by processing unit 104. For example, storage unit 106 and/or memory module 108 may be configured to store information pertaining to the driver settings and/or information pertaining to occupants of back seat 18, such as weight and facial images. Storage unit 106 and/or memory module 108 may be further configured to store look-up tables and/or algorithms. For example, look-up tables and/or algorithms may be utilized to determine whether the weight signal generated by weight sensor 56 is indicative of a child. In one embodiment, processing unit 102 may be configured to compare the weight signal to data of look-up tables in order to determine whether the perceived weight falls within a range indicative of a child. Processing unit 102 may also be configured to utilize algorithms to factor in other weights, such as child car seat 20 detected by weight sensor 56.

Figure 3:
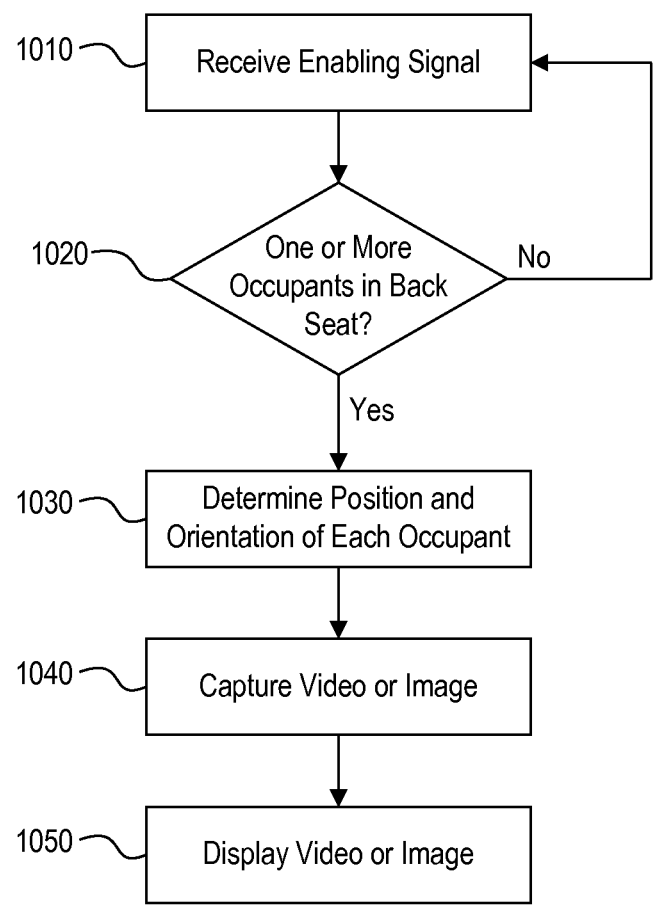
FIG. 3 is a flowchart illustrating an exemplary process that may be performed by the exemplary camera system of FIG. 2, according to an exemplary embodiment of the disclosure.

FIG. 3 illustrates an exemplary method 1000 that may be performed by camera system 11. Operation of exemplary camera system 11 will now be described with respect to FIG. 3.

Method 1000 may begin at Step 1010, when controller 100 receives an enabling signal. The enabling signal may be generated in response to a number of different conditions, such as an input from the driver indicating a desire to visualize an occupant positioned in back seat 18. For example, the enabling signal may be generated by driver actuation of control interface 24 or voice commands from driver received by microphone 26. The enabling signal may also be generated by other audio inputs into microphone 26, such as the crying of a child. The enabling signal may be generated based on visual determination of the occupants, such as a child waking up and/or falling asleep. The enabling signal may further be in response to a condition of vehicle 10, such as vehicle 10 being turned off, vehicle 10 being placed in park, and/or a door of vehicle 10 being opened.

In Step 1020, one or more components of camera system 11 may determine the presence of one or more occupants (e.g., a child) in back seat 18. This determination may be based on signals generated by one or more components, such as weight sensor 56 and/or cameras 52, 54. For example, Step 1020 may be determined based on whether there is a sufficient weight signal generated by weight sensor 56. Controller 100 may receive the weight signal and compare it to data of a look-up table to determine if the sensed weight falls within a range of weights indicative of a child. Step 1020 may be, additionally or alternatively, determined by a signal generated by cameras 52, 54 in conjunction with image recognition software. For example, controller 100 may, in conjunction with image recognition software, process the images captured by cameras 52, 54 to determine the presence of facial features of children. In one embodiment, the determination of Step 1020 may be based on animals and/or people with a wide variety of ages and/or physical characteristics. For example, in one embodiment, camera system 11 may determine the presence an animal (e.g., dog or cat) and/or an adult with special needs in back seat 18. If weight sensor 56 and/or cameras 52, 54 determines that back seat 18 is unoccupied ("No", Step 1020), then camera system 11 may return to Step 1010 where it may receive another enabling signal. However, if camera system 11 determines that back seat 18 is occupied by at least one occupant (e.g., a child) ("Yes", Step 1020), camera system 11 may proceed to Step 1030.

In Step 1030, one or more components of camera system 11 may determine the position and/or the orientation of each occupant. This determination may be based on signals generated by one or more components, such as weight sensor 56 and/or cameras 52, 54.

For example, controller 100 may initially capture an image from two or more of the cameras 52, 54. Controller 100, utilizing image recognition software, for example, may then associate an identity of a person with an image of the person and compare the initial images captured by cameras 52, 54 to determine which initial image provides the most direct image of facial features of the person. For example, controller 100 may disregard any cameras 52, 54 that fail to capture an occupant in the initial image. Controller 100 may also disregard any cameras 52, 54 that fail to provide an image of facial features of an occupant. Accordingly, controller 100 may determine which camera 52, 54 provides the most direct image of facial features of the occupants. Step 1030 may be repeated if none of cameras 52, 54 provide a sufficient image of facial features of an occupant, after it is determined that an occupant is positioned in back seat 18.

Step 1030 may, additionally or alternatively, be performed utilizing weight sensor 56. Weight sensor 56 may be used to determine which back seat 18 is being occupied by each occupant. This may be sufficient in embodiments where there is only one rear camera 54 aligned with each back seat 18. However, in embodiments of vehicle 10 with backward and forward facing rear cameras 54, controller 100 may determine the orientation of each of the occupants utilizing rear cameras 54. For example, controller 100 may actuate rear cameras 54 aligned with the respective seat 18. Controller 100 may then determine the orientation of the occupant by determining which rear camera 54 provides the most direct image of facial features of the occupant(s). Once determined which rear camera 54 provides the most direct image of the occupant(s), camera system 11 may proceed to Step 1040.

In Step 1040, one or more components of camera system 11 may capture a video or an image. Controller 100 may continuously adjust cameras 52, 54, by actuating a motor to tilt and/or focus onto the driver or other vehicle occupant(s). Camera system 11 may also have a variety of different configurations of capturing the video or images. In some embodiments, upon actuation, cameras 52, 54 may continuously capture video or images until disabled. In other embodiments, cameras 52, 54 may capture video or images for a pre-determined time upon actuation. For example, rear camera 54 may be enabled for only a short pre-determined time (e.g., about five seconds), in order to allow the driver or another vehicle occupant to visualize the child, while reducing the distraction. In yet another embodiment, cameras 52, 54 may capture video or images for the length of the enabling signal. For example, in embodiments where the camera system 11 is actuated based on audio (e.g., a child crying), rear camera 54 may stop capturing video or images when the child stops crying.

In Step 1050, one or more components of camera system 11 may display the video or the image, in real time. When vehicle 10 is in motion (e.g., in a forward or reverse gear), camera system 11 may output video or images to HUD 25 in order to minimize the distraction to the driver. When vehicle 10 is not in motion (e.g., in park), camera system 11 may output video or images to HUD 25 and/or user interface 24. Camera system 11 may also display video or images to occupants on display 53 based on the determined positions of the occupants of back seat 18.

Another aspect of the disclosure is directed to a non-transitory computer-readable medium storing instructions which, when executed, cause one or more processors to perform the method of displaying an interior of a vehicle, as discussed above. The computer-readable medium may include volatile or non-volatile, magnetic, semiconductor, tape, optical, removable, non-removable, or other types of computer-readable medium or computer-readable storage device. For example, the computer-readable medium may be storage unit 106 or memory module 108 having the computer instructions stored thereon, as disclosed in connection with FIG. 3. In one embodiment, the computer-readable medium may be a disc or a flash drive having the computer instructions stored thereon.

It will be apparent to those skilled in the art that various modifications and variations can be made to the disclosed camera system. Other embodiments will be apparent to those skilled in the art from consideration of the specification and practice of the disclosed camera system. It is intended that the specification and examples be considered as exemplary only, with a true scope being indicated by the following claims and their equivalents.

What is claimed is:

1. A camera system for a vehicle, the camera system comprising:
a control interface configured to receive an input from a vehicle occupant and generate a first signal;
a plurality of cameras, including:
a first rear camera and a second rear camera, each configured to capture video of a rear seat area of an interior of the vehicle; and
a front camera configured to capture video of a vehicle driver;
a plurality of displays, including:
a first rear display and a second rear display configured to output video to the rear seat area of the interior of the vehicle;
a front display configured to output video to the vehicle driver; and
a controller in communication with the control interface, the plurality of cameras and the plurality of displays, and the controller being configured to:
receive the first signal from the control interface;
actuate the first rear camera to capture a first image;
actuate the second rear camera to capture a second image;
associate an identity of a rear seat occupant with one of the first image and the second image;
compare the first image and the second image;
generate a second signal based on whichever of the first rear camera and the second rear camera provides a more direct image of the rear seat occupant;
output the video to the front display from whichever of the first rear camera and the second rear camera provides a more direct image of the rear seat occupant based on the second signal;
actuate the front camera to capture video of the vehicle driver; and
output the video of the vehicle driver to whichever of the first rear display and second rear display is more visible to the rear seat occupant based on the second signal.

2. The camera system of claim 1, further including:
a weight sensor configured to detect an applied weight and generate a weight signal, wherein the controller is configured to actuate at least one camera of the plurality of cameras based on the weight signal.

3. The camera system of claim 1, wherein at least one of the plurality of cameras is configured to be positioned on a headrest of the vehicle.

4. The camera system of claim 1, wherein the first rear camera is substantially directed toward the front of the vehicle, and wherein the second rear camera is substantially directed toward the back of the vehicle.

5. The camera system of claim 1, further comprising:
a microphone configured to capture audio from the interior of the vehicle and to responsively generate an audio signal directed to the controller,
wherein the controller is configured to actuate at least one of the plurality of cameras based on the audio signal.

6. The camera system of claim 1, wherein the front display includes a head-up display projected on a windshield, and wherein the controller is configured to output the video to the head-up display.

7. The camera system of claim 1, wherein the controller is configured to display the video to the front display for a pre-determined time period.

8. A method for displaying an interior of a vehicle, the method comprising:
receiving an input from a vehicle occupant with a control interface and responsively generating a first signal;
receiving the first signal in a controller;
detecting occupants of the vehicle, including a rear seat occupant;
actuating, via the controller, a first rear camera to capture a first image;
actuating, via the controller, a second rear camera to capture a second image;
associating an identity of the rear seat occupant with one of the first image and the second image;
comparing the first image and the second image;
generating, via the controller, a second signal based on whichever of the first rear camera and the second rear camera provides a more direct image of the rear seat occupant;
capturing video of the rear seat occupant from whichever of the first rear camera and second rear camera provides the more direct image of the rear seat occupant based on the second signal;
displaying the video of the rear seat occupant to a vehicle driver;
actuating, via the controller, a front camera to capture video of the vehicle driver; and
displaying the video of the vehicle driver to whichever of a first rear display and a second rear display is more visible to the rear seat occupant based on the second signal.

9. The method of claim 8, wherein the detecting includes:
sensing a weight applied to a seat and responsively generating a weight signal;
receiving the weight signal in the controller, wherein the actuating the first rear camera and the second rear camera is based on the weight signal.

10. The method of claim 8, wherein
the first rear camera is substantially directed toward a front of the vehicle, and
the second rear camera is substantially directed toward a back of the vehicle.

11. The method of claim 8, wherein the displaying the video of the rear seat occupant to the vehicle driver includes projecting the video on a windshield of the vehicle.

12. The method of claim 8, further comprising:
capturing audio from the interior of the vehicle with a microphone and responsively generating an audio signal; and
actuating the first rear camera and second rear camera based on the audio signal.

13. The method of claim 8, wherein the video of the rear seat occupant is only displayed for a pre-determined time period.

14. The method of claim 8, further comprising adjusting at least one of the first rear camera and the second rear camera based on the position of the occupant.

15. A vehicle operated by a driver comprising:
a camera system including:
a control interface configured to receive an input from a vehicle occupant and generate a first signal;
a plurality of cameras, including:
a first rear camera and a second rear camera, each configured to capture video of a rear seat area of an interior of the vehicle; and
a front camera configured to capture video of a vehicle driver;
a plurality of displays, including:
a first rear display and a second rear display configured to output video to the rear seat area of the interior of the vehicle;
a front display configured to output video to the vehicle driver; and
a controller in communication with the control interface, the plurality of cameras and the plurality of displays, and the controller being configured to:
receive the first signal from the control interface;
actuate the first rear camera to capture a first image;
actuate the second rear camera to capture a second image;
associate an identity of a rear seat occupant with one of the first image and the second image;
compare the first image and the second image;
generate a second signal based on whichever of the first rear camera and the second rear camera provides a more direct image of the rear seat occupant;
output the video to the front display from whichever of the first rear camera and the second rear camera provides a more direct image of the rear seat occupant based on the second signal;
actuate the front camera to capture video of the vehicle driver; and
output the video of the vehicle driver to whichever of the first rear display and second rear display is more visible to the rear seat occupant based on the second signal.

16. A non-transitory computer-readable medium storing instructions which, when executed, cause one or more processors to perform a method of displaying an interior of a vehicle, the method comprising:
receiving an input from a vehicle occupant and responsively generating a first signal;
receiving the first signal in a controller;
detecting additional occupants within the vehicle, including a rear seat occupant;
actuating, via the controller, a first rear camera to capture a first image;
actuating, via the controller, a second rear camera to capture a second image;
associating an identity of the rear seat occupant with one of the first image and the second image;
comparing the first image and the second image;
generating, via the controller, a second signal based on whichever of the first rear camera and the second rear camera provides a more direct image of the rear seat occupant;
capturing video of the rear seat occupant from whichever of the first rear camera and second rear camera provides the more direct image of the rear seat occupant based on the second signal;
displaying the video of the rear seat occupant to a vehicle driver;
actuating, via the controller, a front camera to capture video of the vehicle driver; and
displaying the video of the vehicle driver to whichever of a first rear display and a second rear display is more visible to the rear seat occupant based on the second signal.

* * * * *